United States Patent
Iliadis et al.

(10) Patent No.: US 8,495,281 B2
(45) Date of Patent: Jul. 23, 2013

(54) INTRA-BLOCK MEMORY WEAR LEVELING

(75) Inventors: Ilias Iliadis, Rueschlikon (CH); Theodoros A. Antonakopoulos, Patras (GR); Roman Pletka, Rueschlikon (CH); Xiao-Yu Hu, Rueschlikon (CH); Roy D. Cideciyan, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 12/630,991

(22) Filed: Dec. 4, 2009

(65) Prior Publication Data
US 2011/0138103 A1 Jun. 9, 2011

(51) Int. Cl.
*G06F 12/00* (2006.01)

(52) U.S. Cl.
USPC ........... 711/103; 711/154; 365/185.33

(58) Field of Classification Search
USPC .............. 711/103, 154; 365/185.33
See application file for complete search history.

(56) References Cited

U.S. PATENT DOCUMENTS

| | | | |
|---|---|---|---|
| 6,145,069 A * | 11/2000 | Dye | 711/170 |
| 7,283,395 B2 | 10/2007 | Ziegelmayer | |
| 7,353,325 B2 | 4/2008 | Lofgren et al. | |
| 7,355,892 B2 | 4/2008 | Hemink | |
| 7,477,547 B2 | 1/2009 | Lin | |
| 7,509,471 B2 | 3/2009 | Gorobets | |
| 7,518,919 B2 | 4/2009 | Gonzalez et al. | |
| 7,552,272 B2 | 6/2009 | Gonzalez et al. | |
| 7,656,710 B1 * | 2/2010 | Wong | 365/185.19 |
| 7,804,718 B2 * | 9/2010 | Kim | 365/185.29 |
| 2008/0147998 A1 | 6/2008 | Jeong | |
| 2009/0024905 A1 | 1/2009 | Shalvi et al. | |
| 2009/0067244 A1 | 3/2009 | Li et al. | |
| 2009/0172253 A1 | 7/2009 | Rothman et al. | |
| 2010/0011154 A1 * | 1/2010 | Yeh | 711/103 |

FOREIGN PATENT DOCUMENTS

WO WO 2008106778 A1 * 9/2008

OTHER PUBLICATIONS

Neal Mielke, et al.; Bit Error Rate in NAND Flash Memories; IEEE CFP08RPS-CDR 46th Annual International Reliability Physics Symposium, Phoenix, 2008, pp. 9-19.

Vijayan Prabhakaran, et al.; Transactional Flash; USENIX Association; 8th USENIX Symposium on Operating Systems Design and Implementation; pp. 147-160.

(Continued)

*Primary Examiner* — Stephen Elmore
(74) *Attorney, Agent, or Firm* — Cantor Colburn LLP; Dan Morris (57) ABSTRACT

A method for intra-block wear leveling within solid-state memory subjected to wear, having a plurality of memory cells includes the step of writing to at least certain ones of the plurality of memory cells, in a non-uniform manner, such as to balance the wear of the at least certain ones of the plurality of memory cells within the solid-state memory, at intra-block level. For example, if a behavior of at least some of the plurality of memory cells is not characterized, then the method may comprise characterizing a behavior of at least some of the plurality of memory cells and writing to at least certain ones of the plurality of memory cells, based on the characterized behavior, and in a non-uniform manner.

18 Claims, 3 Drawing Sheets

OTHER PUBLICATIONS

Neal Mielke, et al.; Bit Error Rate in NAND Flash Memories; IEEE CFP08RPS-CDR 46th Annual International Reliability Physics Symposium, Phoenix, 2008. pp. 9-19.

Silicon Systems; Increasing Flash Solid State Disk Reliability; Apr. 13, 2005; storagesearch.com; STORAGEsearch is published by ACSL, pp. 1-5.

Alan R. Olson, et al.; Solid State Drives Data Reliability and Lifetime; White Paper, Apr. 7, 2008; pp. 1-27; Copyright 2008 Imation.

Vijayan Prabhakaran, et al.; Transactional Flash; USENIX Association; 8th USENIX Symposium on Operating Systems Design and Implementation; pp. 147-160. 2008.

* cited by examiner

FIG. 2

INTRA-BLOCK MEMORY WEAR LEVELING

BACKGROUND

The present invention relates to non-volatile memory, and, more specifically, to intra-block wear leveling of non-volatile memory to increase the endurance of the memory.

Solid-state, non-volatile memory (for example, flash memory or EPROM), whether embodied in stand-alone devices (solid-state devices or "SSDs") or as a portion of other circuitry (e.g., processor, volatile memory, etc.), is faced with certain challenges. One is endurance, which is generally defined as the maximum number of write/erase cycles that can be performed on each memory cell before the physical properties of the cell wear out and the cell can then no longer be programmed or erased. Another challenge is data retention, which generally refers to the maximum time period during which the stored data can be read out, possibly with correctable errors. Endurance is typically specified assuming a ten-year data retention period.

Wear leveling is a technique that is widely used to deal with the problem of memory cell wear-out in non-volatile memory. Its goal is to increase memory endurance by distributing program and erase cycles more uniformly throughout the entire non-volatile memory. On the other hand, error-correction codes ("ECC") are used for data retention purposes, specifically, to protect the stored data from corruption (i.e., random bit errors). One wear leveling technique is based on a counter of write-erase cycles per block. This technique aims to balance write/erase cycles among the memory blocks such that no block receives excessive write/erase cycles.

BRIEF SUMMARY

According to one embodiment of the present invention, a method for intra-block wear leveling within solid-state memory subjected to wear and having a plurality of memory cells arranged in blocks is disclosed. The method comprises the step of writing to at least certain ones of the plurality of memory cells within the solid-state memory, in a non-uniform manner, such as to balance the wear of the at least certain ones of the plurality of memory cells within the solid-state memory, at intra-block level.

Other embodiments of the present invention include a system, a computer program product, and a solid-state memory that embody the aforementioned method embodiment of the present invention in the paragraph directly above.

DETAILED DESCRIPTION

Figure 1:
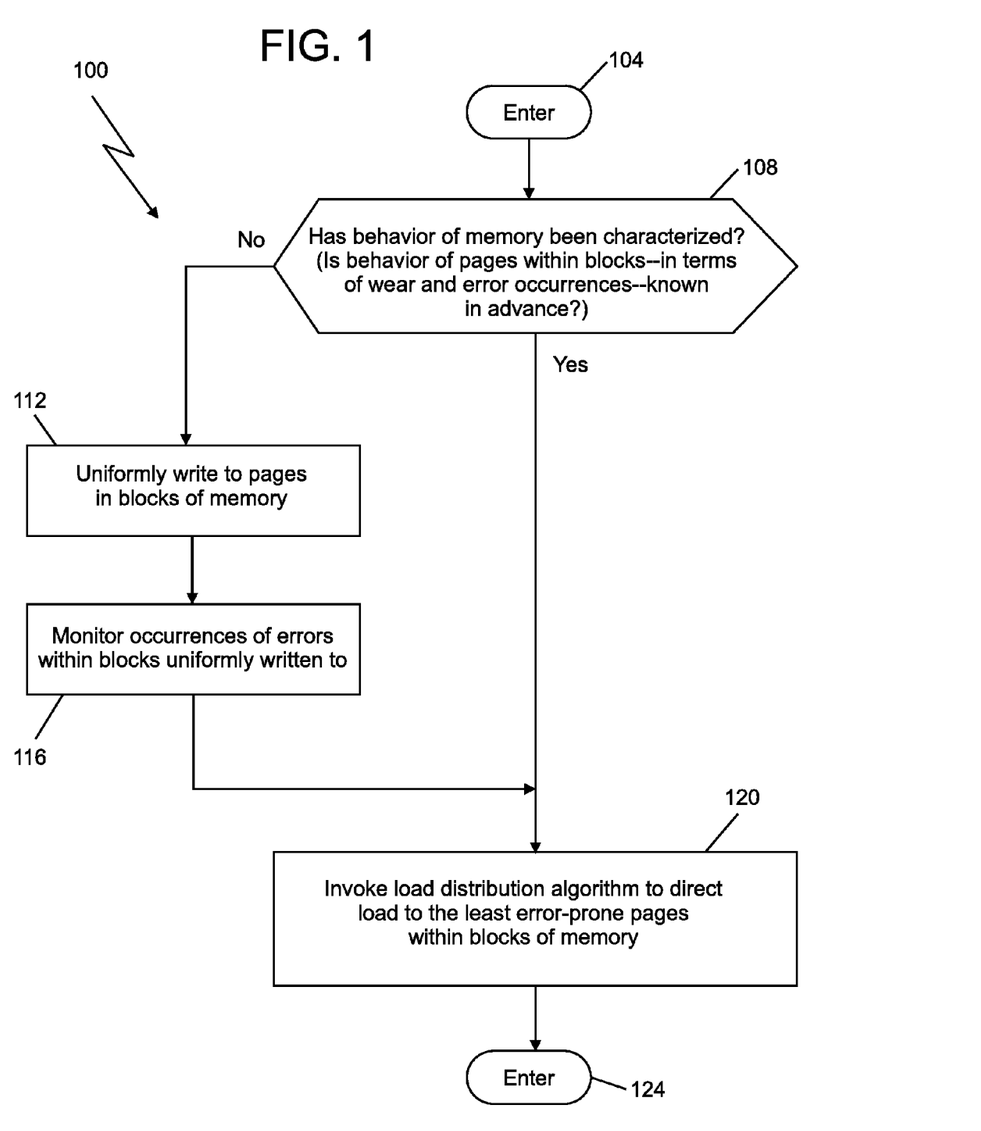
FIG. 1 is a flowchart of steps taken in a method of implementing intra-block wear leveling within solid-state memory in accordance with embodiments of the present invention.
Figure 2:
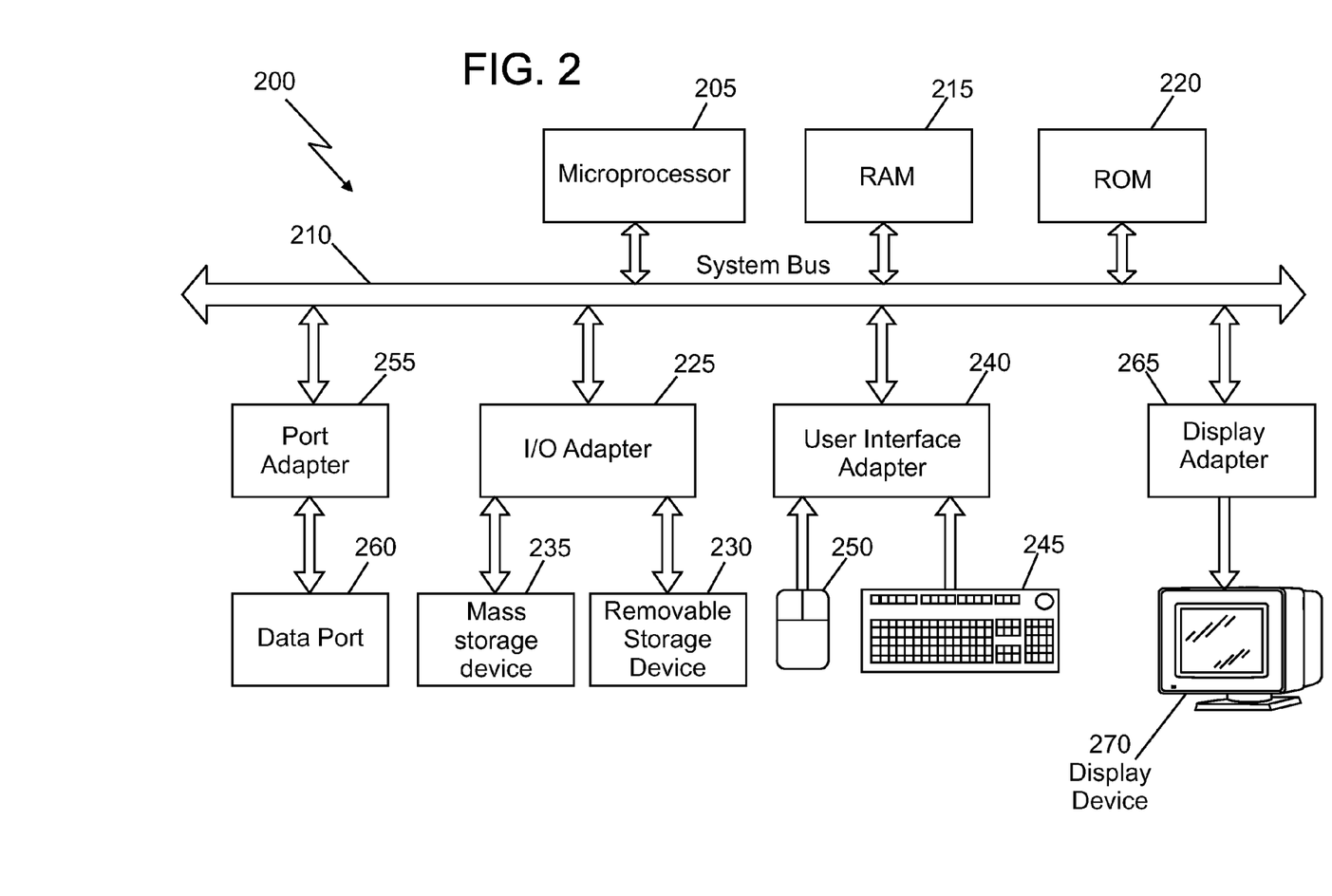
FIG. 2 is a schematic block diagram of a computer system that includes solid-state memory in which embodiments of the present invention may be implemented.

Referring to FIG. 1, there illustrated is a flowchart 100 of steps taken in implementing a method according to embodiments of the present invention for intra-block wear leveling within solid-state memory, thereby improving the endurance of the memory. Referring also to FIG. 2, there illustrated is a schematic block diagram of a computer system 200 suitable for practicing embodiments of the present invention. As described in detail hereinafter, the computer system 200 includes a mass data and/or program memory storage device 235 that may comprise solid-state memory such as flash memory or EPROM. Other embodiments of the present invention may be implemented within the memory storage device 235, which is illustrated in more detail in FIG. 3.

Figure 3:
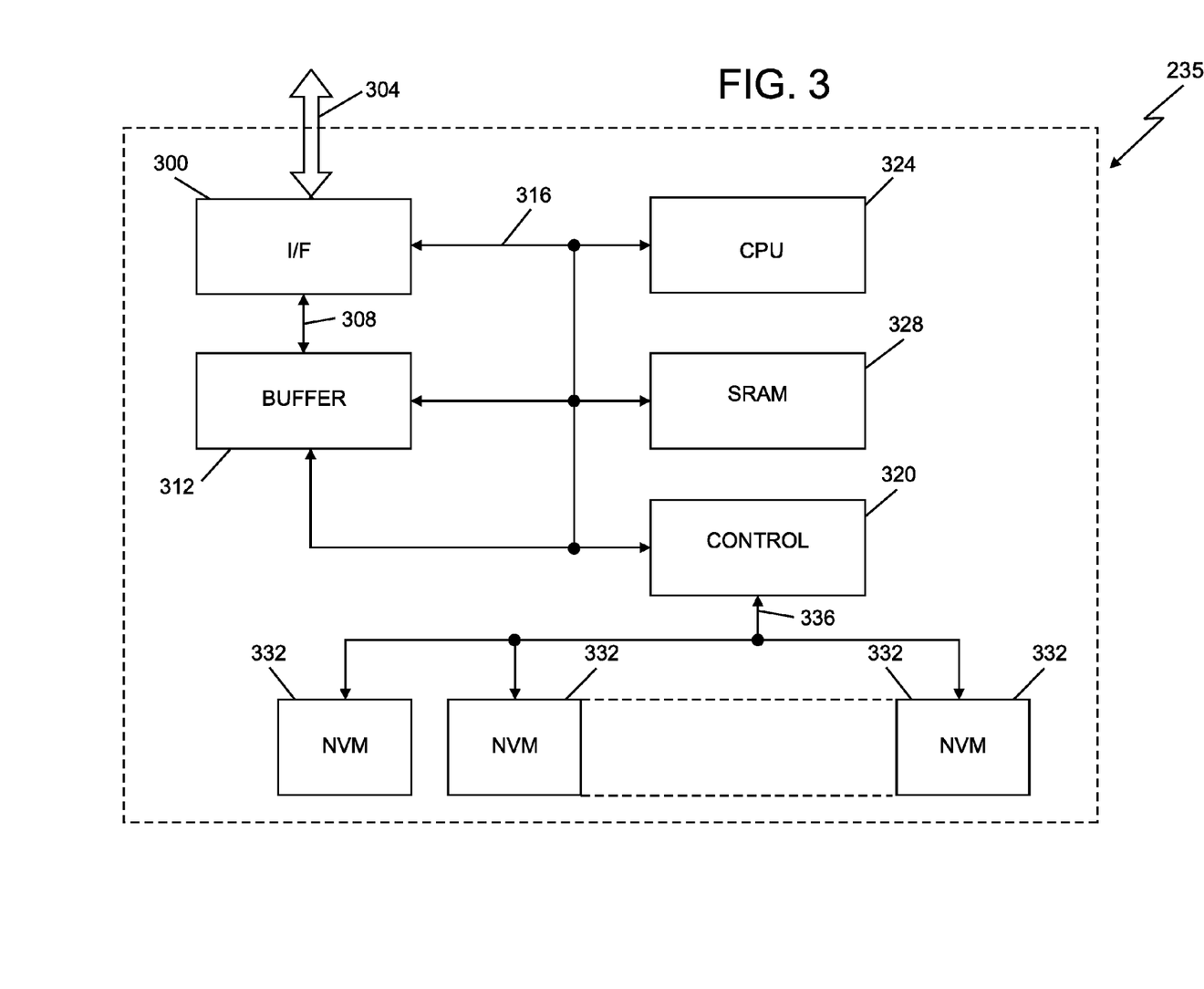
FIG. 3 is a schematic block diagram of the solid-state memory portion of the computer system of FIG. 2 in which embodiments of the present invention may be implemented.

The solid-state memory 235 is typically arranged in blocks of individual memory cells, with pages of cells within each block (typically 64 pages per block). The solid-state memory 235 may comprise a flash memory device, a phase change memory, EPROM or other non-volatile (also persistent) type of memory which is subjected to wear. Thus, in the following, use is indistinctly made of the terminology "non-volatile memory", to designate such a type of memory, unless stated otherwise.

The method of embodiments of the present invention, as illustrated in the flowchart 100 of FIG. 1, may be utilized for implementing intra-block wear leveling of the non-volatile memory 235 of FIGS. 2 and 3. Referring to FIG. 1, after an enter step 104 the method preferably checks, in a step 108, if the behavior of the memory 235 has been characterized. More specifically, the method checks whether or not the behavior of pages within blocks, in terms of wear and error occurrences, is known in advance. From this behavior it can be concluded that each memory cell within the memory 235 has a certain level or degree of susceptibility or proneness to errors occurring within each cell. If not, then that behavior may be obtained by uniformly writing to the pages in blocks of the memory 235 in a step 112 (uniformly writing data to pages in blocks is known per se) and then monitoring in a step 116 the occurrences of errors in those pages uniformly written to within the blocks of memory 235. This may be achieved by selecting a set of blocks and then monitoring the errors occurring in the pages of these blocks when they are being uniformly written. In an embodiment, the errors may be measured by exploiting the results at the decoding phase of the error correction algorithm employed. This way, as time progresses the pages that are relatively more prone or susceptible to errors may be identified. In variants, the behavior of the memory 235 can be known in advance (as e.g. provided in a manufacturer's device specifications). In such case, the behavior need not be characterized; it is rather simply provided as an input data for a subsequent wear leveling process, as to be discussed later.

More specifically, an exemplary embodiment for monitoring the number of errors in the pages of a sample set of blocks of the non-volatile memory 235 includes, at the sample block level, introducing a window of size "w," which considers "w" successive erases of a specific memory block. This may be implemented through a counter <r> in a per-block register, which may be incremented upon each erase operation in the block, and which may be reset when "r" reaches "w". Upon reset, another counter <k>, which represents the index of the window, may be incremented in the per-block register. A further set of counters <e> may be implemented for each sample block. Thus, <e> corresponds to a number of errors on page. These counters may be incremented according to errors occurring within each window. Thus, these counters may be reset when "r" reaches "w". Prior to resetting, a further set of counters <p>, storing the error rate, is updated according to p=e/w. If the deviation between the maximum and minimum error rates (that is, between min(p) and max(p)) exceeds a predetermined threshold, a load distribution algorithm may be activated to direct the load to the least error-prone pages, that is, at an intra-block level.

Now, implementing an intra- or sub-block wear leveling scheme as is the case here does not preclude implementing an additional inter-block leveling scheme. Incidentally, the intra-block and inter-block schemes may be implemented in parallel (even concurrently) or in an interlaced manner. Present inventors have realized that the wear of intra-block memory elements such as pages within blocks of memory is not uniform. For instance, in a particular case of a manufacturer's device, as the number of erase and subsequent uniform page-write operations on a block increases, the mean number of errors occurring in the first 32 pages of the 64 pages typically contained in the block are orders of magnitude higher than the mean number of errors occurring in the last 32 pages of the block. As a result, the uniform distribution of page writes in a block results in non-uniform bit error rates ("BER") for the pages of a block. Also, as time progresses, the wear of the pages increases, and the corresponding raw bit error rate also increases. Consequently, towards the end of the lifetime of a usual solid-state memory, some pages exhibit relatively significantly higher error rates, which results in an increase of the user bit error rate obtained after the decoding operation of the error correction method used. This in turn reduces the endurance of such a memory. Therefore, an intra-block wear leveling scheme is proposed here. As another remark, because typical solid-state memories are typically arranged in blocks of individual memory cells, with pages of cells within each block, it is mostly proposed herein that a non-uniform load be applied to pages in blocks, which offers a convenient partition inasmuch as programming operations are performed page-at-a-time (on a page basis, e.g. for NAND memories) whereas erase operations are performed at the block level. However, other partitions can be contemplated, according to the type of memory device considered. For example, for a device offering byte-level programming, like EEPROM, other partitions could be more convenient. Thus, more generally, the load algorithm results in non-uniformly loading groups of at least one memory cell (or at least certain ones of the cells).

Referring back to the embodiment of FIG. 1, if it was determined in the step 108 that the error behavior of the pages within blocks of memory 235 has already been characterized (or after the error behavior of the pages within blocks is characterized and known from the steps 112, 116 such that the error behavior shows relatively significant divergence that exceeds a predetermined threshold), an appropriate load distribution algorithm is invoked in a step 120 that directs the load (i.e., the writing) to the least error-prone pages of the blocks within the non-volatile memory 235. To maintain a relatively equal amount of wear in the memory cells (or equivalently a relatively equal number of errors per page), subsequent write operations may be primarily directed to those pages that are less prone to errors. This type of non-uniform intra-block page loading achieves a relatively equal leveling of the wear among the pages of a block, which implies a similar error behavior. Embodiments of the invention thus increase the usable lifetime of the non-volatile memory. The method then ends in a step 124.

The load distribution algorithm may comprise one in which subsequent writes are performed according to a static non-uniform page write distribution. This distribution is defined such that the expected long-term wear of the pages is approximately similar, thereby resulting in bit error probabilities of the same order.

In the alternative, the load distribution algorithm may comprise one in which the degree of reliability of each page of the selected blocks is updated based on error correcting code ("ECC") statistics. Subsequent writes are performed according to a dynamic non-uniform page write distribution that is periodically defined based on these statistics, such that the expected long-term wear is approximately similar, thereby resulting in bit error probabilities of the same order.

Other implementations of embodiments of load distribution algorithms are possible.

Embodiments of the present invention reduce the unbalanced wear within blocks of non-volatile memory such that the bit error rate does not exhibit relatively large variations among the pages of a block. Restoring the wear balance is achieved in embodiments of the present invention by loading the pages that are relatively less prone to errors than the remaining pages.

As evoked earlier, the behavior of the memory can yet be known in advance. Thus, pages that are relatively less prone to errors than the remaining pages can either be known in advance (should be statistically or even a guess), depending on the manufacturer and type of memory, or can be identified e.g. by monitoring the occurrence of errors in the pages within memory blocks. Accordingly, the behavior of the memory can be provided as input for subsequent wear leveling.

Even, in cases where a systematic behavior can be expected, the behavior need not be given as input. Rather, the writing operations can be prefixed (i.e. hardcoded) such as to balance the wear within blocks of the non-volatile memory. In such a case, how the input or configuration data that reflects the behavior of the memory impacts the (non-uniform) load algorithm is embedded directly into the source code of a program or other executable object, etc., driving the writing operations. More generally, the writing operations to memory cells are conducted in a non-uniform manner, such as to balance the wear of cells and this, already at intra-block level, in contrast with the inter-block wear leveling schemes known in the art.

In this regards, it would be a waste to mark an entire block as a bad block if there are just a few pages that can no longer be used as the number of errors can no longer be corrected with the ECC of the device. Suppose now that the behavior of the memory is known in advance (e.g. in general the same pages in different blocks have similar endurance characteristics), one can then partition pages of blocks into two or more categories such that pages in the same category have approximately the same endurance, thereby defining "weak" pages less and "strong" pages. A suitable load algorithm (e.g. hardcoded) can then be implemented, which loads the pages according to their endurance characteristics. For instance, in a minimal implementation, two categories could be designed, one for the weak pages, another one for the relatively strongest pages. The strongest pages could be loaded e.g. twice more often than the weakest.

In a variant, suppose that the location of weak pages is not fixed within memory blocks but instead follows a statistical pattern with respect to the internal page address. In this case a statistical approach can be used to load the pages according to their endurance characteristics, e.g. load the weak pages less frequently and strong pages more frequently and this, according to the known statistical pattern. A sub-block wear leveling is accordingly achieved, in a statistical sense. In practice, the load algorithm is non-uniform already for groups of pages whose size is likely less than the size of a block, on average, and irrespective of whether a group of pages belongs to a same block, whence the terminology of "sub-block wear leveling" used here. Now, implementing such an algorithm results in that at least some of the blocks (if not all) are non-uniformly loaded, such that the "sub-block wear leveling" alluded to above effectively results in an intra-block wear leveling scheme, that is, a non-uniform load of pages within blocks. Incidentally, the load algorithm need not be the same for all groups and, as a result, for all blocks.

Next, the above two variants depend on a priori information (the behavior of the memory is known in advance). As discussed yet, other approaches do not rely on such information but instead "learn" the behavior of the memory. This notably is the case when the error-correcting information of pages is characterized. Yet, grouping of pages into categories can be fixed without a priori information of the device, in embodiments. Hence, the characterization (or monitoring), if any, may in this case restrict to error-correction information only. Accordingly, the non-uniform load algorithm shall then utilize the monitored error-correction information. In the absence of a priori information, a single page can for instance build a category on which the non-uniform load algorithm is applied.

Besides, from a certain point on, the non-uniform load algorithm can, in embodiments, result in no data being written to cells or pages in a block. In such a case, the cells/pages at stake or categories thereof can be considered to be retired or marked as "bad" without having to actually mark the full block as a bad block. Incidentally, when using categories, information about retired categories can be explicitly maintained without requiring additional space for storing this meta-data information. This can for instance be achieved by utilizing existing meta-data locations defined e.g. in the ONFI standard, namely the bad block marker. The number of categories is then limited to the size of the bad block marker.

In practice, it has been shown that the magnitude of lifetime improvement of the non-volatile memory 235 is relatively significant using embodiments of the intra-block wear leveling of the present invention. If one considers a comparison of the simple uniform loading as is known in the art versus the non-uniform loading (i.e. the intra-block wear leveling) of embodiments of the present invention, for the same number of write/erase cycles, the embodiments of the present invention result in a bit error rate ("BER") at the most stressed pages which is an order of magnitude less than the BER of the same pages when using uniform intra-block loading. Assuming that an ECC code is used with k bits per page error correction capability, a block of memory is determined as a "bad" block when k or more erroneous bits occur in at least one page of that block. In this case, the same behavior in terms of the BER at the most stressed pages is determined for a different number of write/erase cycles per loading approach. For example, if k=10, the non-uniform intra-block page loading of embodiments of the present invention results in a bad block condition after approximately 1M cycles, while the known uniform intra-block page loading approach results in a bad block condition after approximately 500K cycles. As such, the endurance of the non-volatile memory is extended in this case by a factor of two.

As will be appreciated by one skilled in the art, aspects of the present invention may be embodied as a system, method or computer program product, in addition to a non-volatile memory. Accordingly, aspects of the present invention may take the form of an entirely hardware embodiment, an entirely software embodiment (including firmware, resident software, microcode, etc. within the non-volatile memory 235) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus or device (e.g., the solid-state memory 235 itself, when the latter is suitably coupled to one or more processor to execute the said instructions) to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 2, computer system 200 has at least one microprocessor or central processing unit (CPU) 205. CPU 205 is interconnected via a system bus 210 to a random access memory (RAM) 215, a read-only memory (ROM) 220, an input/output (I/O) adapter 225 for a connecting a removable data and/or program storage device 230 and a mass data and/or program storage device 235, a user interface adapter 240 for connecting a keyboard 245 and a mouse 250, a port adapter 255 for connecting a data port 260 and a display adapter 265 for connecting a display device 270.

ROM 220 contains the basic operating system for computer system 200. The operating system may alternatively reside in RAM 215 or elsewhere as is known in the art. Examples of removable data and/or program storage device 230 include magnetic media such as floppy drives and tape drives and optical media such as CD ROM drives. Examples of mass data and/or program storage device 235 include hard disk drives and non-volatile memory such as flash memory or EPROM. In addition to keyboard 245 and mouse 250, other user input devices such as trackballs, writing tablets, pressure pads, microphones, light pens and position-sensing screen displays may be connected to user interface 240. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for, or the computer program created to run, embodiments of the present invention is loaded on the appropriate removable data and/or program storage device 230, fed through data port 260 or typed in using keyboard 245.

More specifically, as mentioned hereinabove, embodiments of the present invention may be implemented within the non-volatile memory device 235 itself. Referring to FIG. 3, such a device 235 may comprise a flash memory, EPROM, or other type of non-volatile memory, typically in the form of a solid-state device ("SSD"). An exemplary embodiment of such a SSD non-volatile memory device 235 is shown in FIG. 3. There, an interface 300 connects by a bus 304 back to the I/O adapter 225 (FIG. 2). The interface 300 also connects within the memory device 235 by a data bus 308 to a buffer 312, which may comprise dynamic random access memory ("DRAM"). The buffer 312 connects via a control bus 316 to a controller 320 for the memory device 235. Also connected to the control bus 316 is a central processing unit ("CPU") 324 and static RAM ("SRAM") 328. The CPU 324 is the main controller for the memory device 235, while the controller 320 writes the data originally on the bus 308 to the plurality of non-volatile memory ("NVM") cells 332 from a bus 336. If the non-volatile memory device 235 comprises a flash memory, then the plurality of memory cells 332 within the device 235 may comprise NAND cells or NOR cells.

The CPU 324, as the main controller for the memory device 235, coordinates the writing of data from and reading of data to the memory cells 332. The CPU 324 also executes the intra-block wear leveling method of embodiments of the present invention. As mentioned, the method may be embodied as firmware (e.g., microcode of software) embedded within the memory device (e.g., stored in the memory cells 332 as instructions) and executed by the CPU 324.

In the alternative, in embodiments of the present invention that are implemented in software as mentioned above and carried out using the computer system 200 of FIG. 2, this situation is applicable to where the characteristics of the technology used in the non-volatile memory device 235 causes a non-uniform wear pattern under uniform loading conditions, and both the characteristics and the non-uniform wear pattern are known in advance. Now, note that the non-volatile memory device need not be "attached" to a PC. In fact, implementing the present intra-block wear-leveling scheme turns out advantageous, whether the solid state memory concerned is coupled to a server, storage system, or a PC, etc. In addition, core principles of present embodiments remain the same, whether the device is an SSD, a PCI-attached device acting as a block device or a Flash cache, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for intra-block wear leveling within solid-state memory subjected to wear, and having a plurality of memory cells arranged in blocks, the method comprising the step of:
writing to at least certain ones of the plurality of memory cells within the solid-state memory, in a non-uniform manner, such as to balance the wear of the at least certain ones of the plurality of memory cells within the solid-state memory, at intra-block level;
providing a behavior of at least some of the plurality of memory cells within the solid-state memory;
wherein the step of writing comprises writing to at least certain ones of the plurality of memory cells within the solid-state memory based on the provided behavior of the at least some of the memory cells within the solid-state memory, thereby writing to the at least certain ones of the plurality of memory cells within the solid-state memory in a non-uniform manner.

2. The method of claim 1, wherein the step of providing further comprises:
if the behavior of at least some of the plurality of memory cells within the solid-state memory is not characterized, then characterizing the behavior of at least some of the plurality of memory cells within the solid-state memory.

3. The method of claim 2, wherein the behavior of the at least some of the plurality of memory cells within the solid-state memory comprises a susceptibility to an error occurrence of each of the at least some of the plurality of memory cells within the solid-state memory.

4. The method of claim 2, wherein characterizing a behavior of at least some of the plurality of memory cells within the solid-state memory further comprises uniformly writing to at least some of the plurality of memory cells within the solid-state memory arranged as pages within blocks of the plurality of memory cells, and monitoring for errors the at least some of the plurality of memory cells within the pages of the blocks that are uniformly written to.

5. The method of claim 1, wherein the solid-state memory comprises one of a flash memory, a phase-change memory and an EPROM.

6. A computer program product for intra-block wear leveling within solid-state memory, the computer program product comprising:
a non-transitory computer-readable storage medium having computer readable program code embodied therewith, the computer readable program code comprising:
computer readable program code configured to implement a method for intra-block wear leveling within solid-state memory subjected to wear, and having a plurality of memory cells arranged in blocks, the method comprising the step of:
writing to at least certain ones of the plurality of memory cells within the solid-state memory, in a non-uniform manner, such as to balance the wear of the at least certain ones of the plurality of memory cells within the solid-state memory, at intra-block level; and
providing a behavior of at least some of the plurality of memory cells within the solid-state memory;
wherein the step of writing comprises writing to at least certain ones of the plurality of memory cells within the solid-state memory based on the provided behavior of the at least some of the memory cells within the solid-state memory, thereby writing to the at least certain ones of the plurality of memory cells within the solid-state memory in a non-uniform manner.

7. The computer program product of claim 6, wherein the step of providing further comprises:
if the behavior of at least some of the plurality of memory cells within the solid-state memory is not characterized, then characterizing the behavior of at least some of the plurality of memory cells within the solid-state memory.

8. The computer program product of claim 7, wherein the behavior of the at least some of the plurality of memory cells within the solid-state memory comprises a susceptibility to an error occurrence of each of the at least some of the plurality of memory cells within the solid-state memory.

9. The computer program product of claim 7, wherein characterizing a behavior of at least some of the plurality of memory cells within the solid-state memory further comprises uniformly writing to at least some of the plurality of memory cells within the solid-state memory arranged as pages within blocks of the plurality of memory cells, and monitoring for errors the at least some of the plurality of memory cells within the pages of the blocks that are uniformly written to.

10. The computer program product of claim 7, wherein writing to at least certain ones of the plurality of memory cells within the solid-state memory based on the characterized behavior of the at least some of the memory cells within the solid-state memory further comprises writing to the at least certain ones of the plurality of memory cells according to a static non-uniform page write distribution in which an expected long-term wear of the plurality of memory cells arranged as pages within blocks is approximately similar, thereby resulting in bit error probabilities of the same order.

11. The computer program product of claim 7, wherein writing to at least certain ones of the plurality of memory cells within the solid-state memory based on the characterized behavior of the at least some of the memory cells within the solid-state memory further comprises writing to the at least certain ones of the plurality of memory cells according to a dynamic non-uniform page write distribution that is periodically defined based on updated error correction code statistics, such that an expected long-term wear of the at least certain ones of the plurality of memory cells is approximately similar, thereby resulting in bit error probabilities of the same order.

12. A system, comprising:
a computing network including a processing device in communication with one or more computer memory storage devices; and
the computing network further configured to implement a method for intra-block wear leveling within solid-state memory subjected to wear, and having a plurality of memory cells arranged in blocks, the method comprising the steps of:
writing to at least certain ones of the plurality of memory cells within the solid-state memory, in a non-uniform manner, such as to balance the wear of the at least certain ones of the plurality of memory cells within the solid-state memory, at intra-block level;
providing a behavior of at least some of the plurality of memory cells within the solid-state memory;

wherein the step of writing comprises writing to at least certain ones of the plurality of memory cells within the solid-state memory based on the provided behavior of the at least some of the memory cells within the solid-state memory, thereby writing to the at least certain ones of the plurality of memory cells within the solid-state memory in a non-uniform manner.

13. The system of claim 12, wherein in the method implemented by the computing network, the step of providing further comprises:
   if the behavior of at least some of the plurality of memory cells within the solid-state memory is not characterized, then characterizing the behavior of at least some of the plurality of memory cells within the solid-state memory.

14. The system of claim 13, wherein the behavior of the at least some of the plurality of memory cells within the solid-state memory comprises a susceptibility to an error occurrence of each of the at least some of the plurality of memory cells within the solid-state memory.

15. The system of claim 13, wherein characterizing a behavior of at least some of the plurality of memory cells within the solid-state memory further comprises uniformly writing to at least some of the plurality of memory cells within the solid-state memory arranged as pages within blocks of the plurality of memory cells, and monitoring for errors the at least some of the plurality of memory cells within the pages of the blocks that are uniformly written to.

16. The system of claim 12, wherein the solid-state memory comprises one of a phase-change memory, an EPROM, and a flash memory having a plurality of NAND memory cells.

17. A solid-state memory, comprising:

a processor;

a plurality of memory cells, where the processor is further configured to implement a method for intra-block wear leveling of at least some of the plurality of memory cells, the method further including the steps of writing to at least certain ones of the plurality of memory cells within the solid-state memory, in a non-uniform manner, such as to balance the wear of the at least certain ones of the plurality of memory cells within the solid-state memory, at intra-block level; and providing a behavior of at least some of the plurality of memory cells within the solid-state memory;

wherein the step of writing comprises writing to at least certain ones of the plurality of memory cells within the solid-state memory based on the provided behavior of the at least some of the memory cells within the solid-state memory, thereby writing to the at least certain ones of the plurality of memory cells within the solid-state memory in a non-uniform manner.

18. The solid-state memory of claim 17, wherein in the method implemented by the processor, the step of providing further comprises:
   if the behavior of at least some of the plurality of memory cells within the solid-state memory is not characterized, then characterizing the behavior of at least some of the plurality of memory cells within the solid-state memory.

* * * * *